(12) United States Patent
Oh

(10) Patent No.: US 8,965,345 B2
(45) Date of Patent: Feb. 24, 2015

(54) MOBILE COMMUNICATION TERMINAL AND METHOD FOR PLAYING MESSAGE IN REAL TIME THEREOF

(75) Inventor: Jungkyun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1426 days.

(21) Appl. No.: 11/779,609

(22) Filed: Jul. 18, 2007

(65) Prior Publication Data

US 2008/0026779 A1 Jan. 31, 2008

(30) Foreign Application Priority Data

Jul. 26, 2006 (KR) .................. 10-2006-0070091

(51) Int. Cl.
  G06F 15/16 (2006.01)
  H04L 12/64 (2006.01)
  H04L 12/58 (2006.01)
  H04L 29/06 (2006.01)

(52) U.S. Cl.
  CPC .......... *H04L 12/6418* (2013.01); *H04L 12/587* (2013.01); *H04L 51/24* (2013.01); *H04L 12/581* (2013.01); *H04L 51/04* (2013.01); *H04L 65/4084* (2013.01)
  USPC .......... 455/412.2; 455/466; 709/231; 709/232

(58) Field of Classification Search
  USPC ................................. 709/231, 232; 455/466
  See application file for complete search history.

(56) References Cited

U.S. PATENT DOCUMENTS

| | | | | |
|---|---|---|---|---|
| 5,907,683 A | * | 5/1999 | Engelsiepen et al. | 709/231 |
| 2003/0224809 A1 | * | 12/2003 | Savinen et al. | 455/466 |
| 2004/0148400 A1 | * | 7/2004 | Mostafa | 709/227 |
| 2004/0218586 A1 | * | 11/2004 | Khoury et al. | 370/352 |
| 2005/0215272 A1 | * | 9/2005 | Helferich | 455/512 |
| 2006/0021057 A1 | * | 1/2006 | Risan et al. | 726/26 |
| 2006/0155814 A1 | * | 7/2006 | Bennett et al. | 709/207 |

FOREIGN PATENT DOCUMENTS

| | | |
|---|---|---|
| JP | 2000181838 | 6/2000 |
| JP | 2004505384 | 2/2004 |
| JP | 2004518385 | 6/2004 |
| JP | 2004534419 | 11/2004 |
| JP | 2004343698 | 12/2004 |
| JP | 2005025627 | 1/2005 |
| KR | 20040059662 | 7/2004 |
| KR | 20060078471 | 7/2006 |
| WO | 02/11398 | 2/2002 |
| WO | 02/063849 | 8/2002 |
| WO | 2004/045230 | 5/2004 |

* cited by examiner

Primary Examiner — Joshua Schwartz
(74) Attorney, Agent, or Firm — Lee, Hong, Degerman, Kang & Waimey

(57) ABSTRACT

The present invention is related to playing a message in real-time in a mobile communication terminal. The present includes receiving a notification message from a server for notifying arrival of a specific message in the server, determining whether the specific message is a real-time streaming enable message by checking a specific field of the notification message, generating a reply message if the specific message is the real-time streaming enable message, the reply message comprising a specific field including streaming receiving mode information, sending the generated reply message to the server, requesting a connection with the server, receiving in real-time at least one media file included in the specific message from the server according to a predetermined sending level, and playing the received media file in real-time.

16 Claims, 8 Drawing Sheets

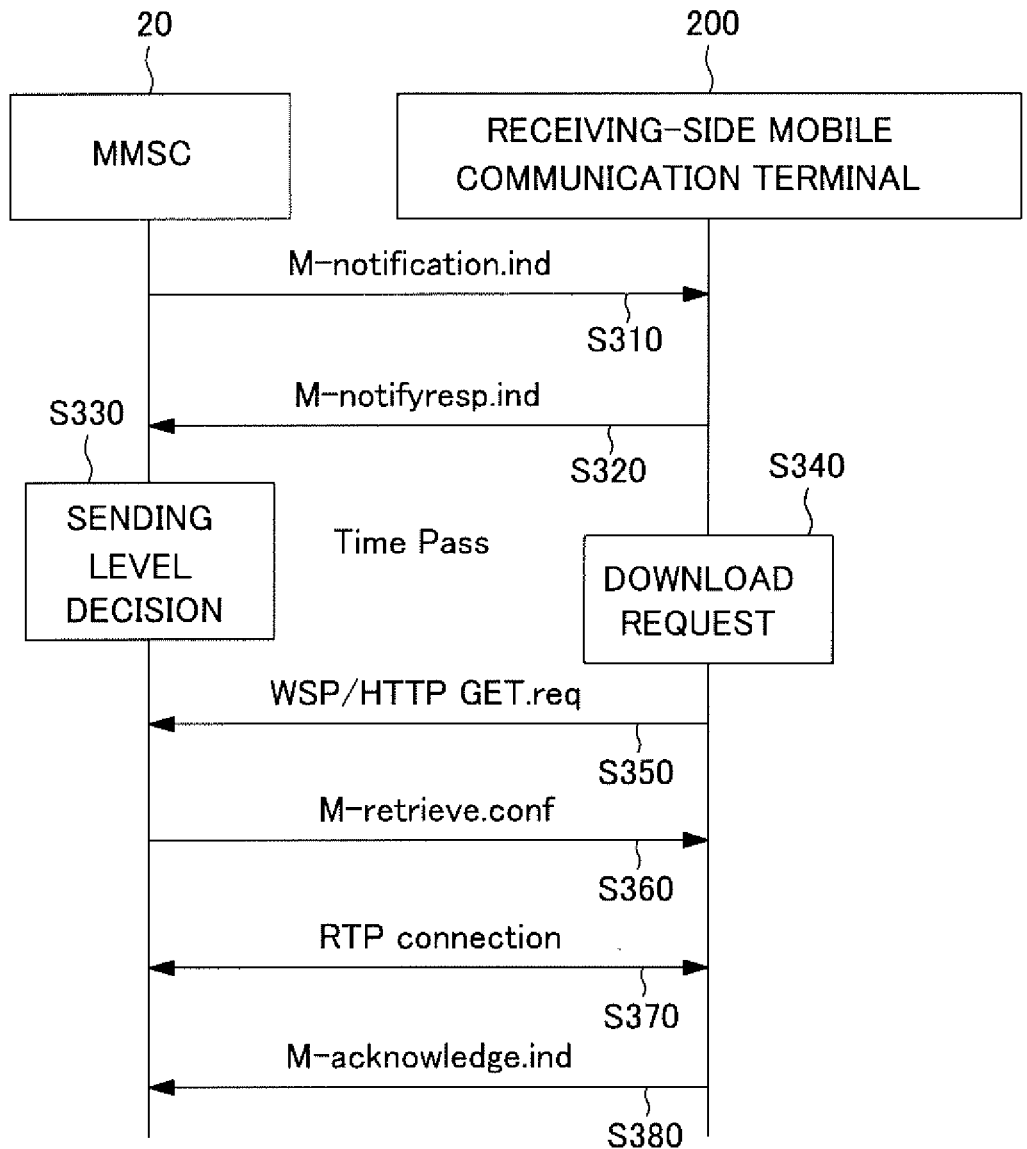

FIG. 4

| FIELD NAME | DESCRIPTION |
|---|---|
| X-Mms-Message-Type | CHARACTERISTICS OF DATA PACKET |
| X-Mms-Transaction-ID | This transaction ID identifies the M-Notification.ind and the corresponding M-NotifyResp.ind |
| X-Mms-MMS-Version | The MMS version number. |
| From | Address of the last MMS Client that handled the MM, i.e. that sent or forwarded the MM. |
| Subject | Subject of the message. |
| X-Mms-Delivery-Report | Specifies whether the user wants a delivery report from each recipient. |
| X-Mms-Message-Class | Class of the message. |
| X-Mms-Message-Size | Size of the MM |
| X-Mms-Expiry | Length of time the message will be available. |
| X-Mms-Reply-Charging | If this field is present its value is set to "accepted" or "accepted text only" and the MMS-version-value of the M-Notification.ind PDU is higher than 1.0, this header field will indicate that a reply to this particular MM is free of charge for the recipient. |
| X-Mms-Reply-Charging-Deadline | It specifies the latest time the recipient has to submit the Reply-MM. After this time the originator of the Original-MM will not pay for the Reply-MM any more. |
| X-Mms-Reply-Charging-Size | It specifies the maximum size(number of octets) for the Reply-MM. |
| X-Mms-Reply-Charging-ID | The value of this header field SHALL be the same as the Message-ID of the Original-MM that is replied to. |
| X-Mms-Content-Location | URL where message is stored. |

410 → X-Mms-Message-Class

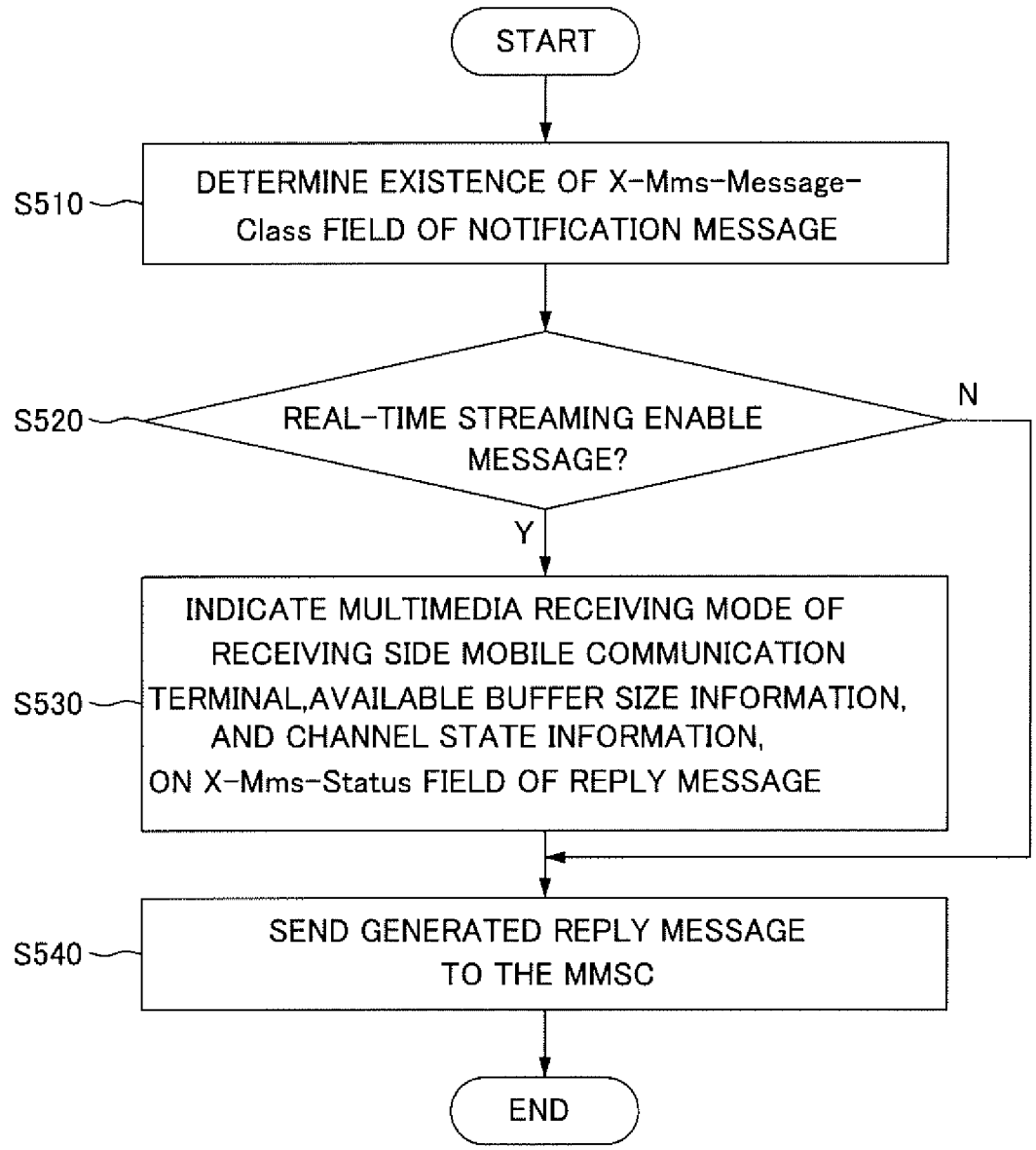

FIG. 6

| FIELD NAME | DESCRIPTION |
|---|---|
| FIELD NAME | CHARACTERISTICS OF DATA PACKET |
| X-Mms-Transaction-ID | THE SAME ID AS M-Notification.ind |
| X-Mms-MMS-Version | MMS VERSION |
| 610 — X-Mms-Status | STATUS OF PREFERENCE FOR RECEIVING MMS |
| X-Mms-Report-Allowed | SELECTION AND SENDING ACCORDING TO Delivery Report item. |

MOBILE COMMUNICATION TERMINAL AND METHOD FOR PLAYING MESSAGE IN REAL TIME THEREOF

CROSS-REFERENCE TO RELATED APPLICATIONS

Pursuant to 35 U.S.C. §119(a), this application claims the benefit of earlier filing date and right of priority to Korean Application No. 10-2006-0070091, filed on Jul. 26, 2006, the contents of which are hereby incorporated by reference herein in their entirety.

FIELD OF THE INVENTION

The present invention relates to a mobile communication terminal and a method for playing a message in real-time in the mobile communication terminal.

BACKGROUND OF THE INVENTION

A Multimedia Message Service (MMS) utilized by a mobile communication terminal is a service more advanced than an existing Short Message Service (SMS). The MMS facilitates the sending/receiving of multimedia messages between mobile communication terminals using a wireless Internet data transfer service, and/or the sending/receiving of email messages via an Internet network in the mobile communication terminal.

Recently, utilization of the MMS has increased in comparison with the text-based SMS. Notably, the SMS can only send/receive characters and numerals, while the MMS can send/receive various types of data, such as moving images, pictures and sounds, for example.

Generally, when a multimedia message is sent by a sending-side mobile communication terminal, the message is first sent to a Multimedia Message Service Center (MMSC). The MMSC then sends a notification message for notifying arrival of the multimedia message to a receiving-side mobile communication terminal. A user of the receiving-side mobile communication terminal can then display the multimedia message after completing a download of various media files included in the multimedia message sent from the sending-side mobile communication terminal.

However, if a space for storing the downloaded media files does not exist in the mobile communication terminal, the multimedia message can not be displayed until previously-stored media files are deleted. Additionally, because the multimedia message can be displayed only after completing the download of the media files, a user of the mobile communication terminal must undesirably wait a period of time prior to viewing the multimedia message.

SUMMARY OF THE INVENTION

Accordingly, the present invention has been made to solve the above-mentioned problems occurring in the prior art, and an object of the present invention is to provide a mobile communication terminal and a method for playing a message in real time in the mobile communication terminal, which can download and play media files included in the message in real time.

Additional advantages, objects and features of the invention will be set forth in part in the description which follows and in part will become apparent to those having ordinary skill in the art upon examination of the following or may be learned from practice of the invention.

According to an aspect of the present invention, there is provided a method for playing a message in real-time in a mobile communication terminal, the method comprising receiving a notification message from a server for notifying arrival of a specific message in the server, determining whether the specific message is a real-time streaming enable message by checking a specific field of the notification message, generating a reply message if the specific message is the real-time streaming enable message, the reply message comprising a specific field including streaming receiving mode information, sending the generated reply message to the server, requesting a connection with the server, receiving in real-time at least one media file included in the specific message from the server according to a predetermined sending level, and playing the received media file in real-time.

In accordance with another embodiment of the present invention, a mobile communication terminal for playing a message in real-time comprises a wireless transceiver receiving a notification message from a server for notifying arrival of a specific message in the server, a processor determining whether the specific message is a real-time streaming enable message by checking a specific field of the notification message, and a controller generating a reply message if the specific message is the real-time streaming enable message, the reply message comprising a specific field including streaming receiving mode information, wherein the controller sends the generated reply message to the server via the wireless transceiver and requests a connection with the server, wherein the wireless transceiver receives in real-time at least one media file included in the specific message from the server according to a predetermined sending level and the controller plays the received media file in real-time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 is a flow chart illustrating a method for playing a message in real-time in a mobile communication terminal in accordance with an exemplary embodiment of the present invention.

FIG. 4 illustrates a format of a header field of an M-notification.ind message in accordance with an exemplary embodiment of the present invention.

FIG. 5 illustrates a flow chart of a process for sending an M notification.ind M-notifiyresp.ind message to a Multimedia Message Service Center (MMSC), as shown in FIG. 3, in accordance with an exemplary embodiment of the present invention.

FIG. 6 illustrates a format of a header field of an M-notifiyresp.ind message in accordance with an exemplary embodiment of the present invention.

DETAILED DESCRIPTION OF THE PREFERRED EMBODIMENTS

The present invention relates to playing a real-time message in a mobile communication terminal. Hereinafter, exemplary embodiments of the present invention will be described in detail with reference to the accompanying drawings. A mobile communication terminal includes a cellular phone, a personal communication system (PCS) phone, a personal data assistant (PDA) and an international mobile communication-2000 (IMT-2000) terminal, for example.

Figure 1:
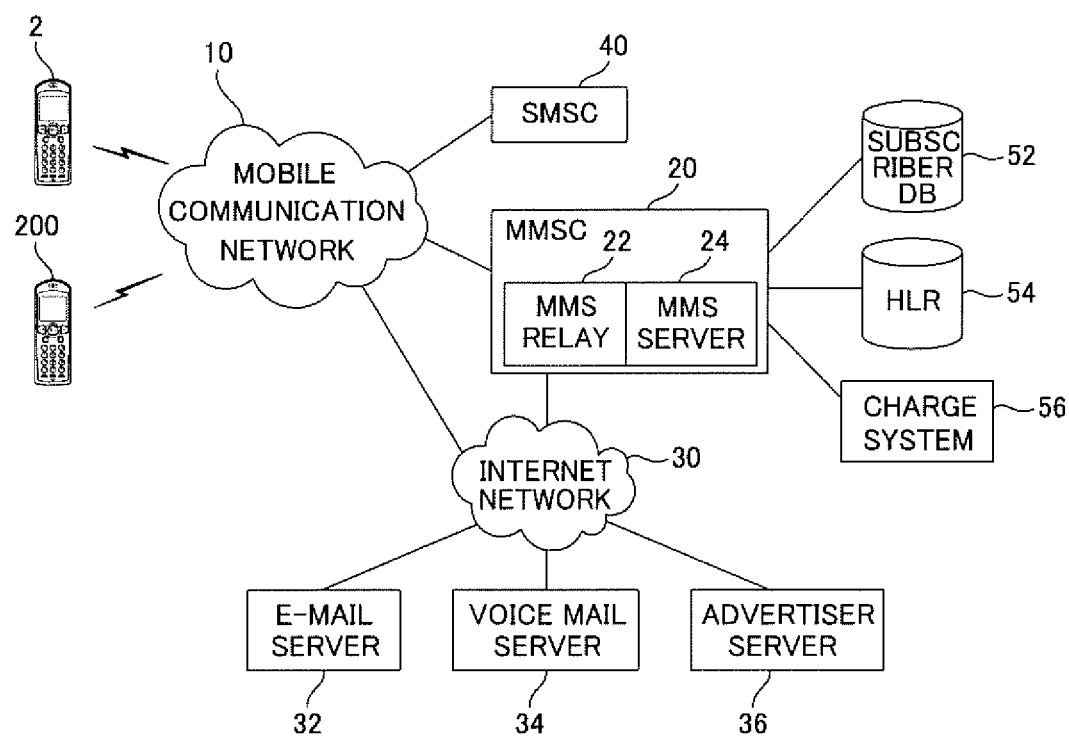
FIG. 1 is a block diagram illustrating a network system, wherein a method for playing a message in real-time in a mobile communication terminal is applied in accordance with an exemplary embodiment of the present invention.

FIG. 1 is a block diagram illustrating a network system, wherein a method for playing a message in real-time in a mobile communication terminal may be applied in accordance with an exemplary embodiment of the present invention. Referring to FIG. 1, a program for performing a multimedia message service is installed in a sending-side mobile communication terminal 2. A user can directly author a multimedia message using multimedia contents created by functions of the mobile communication terminal 2, such as a camera function, sound function, etc.

The multimedia message authored by the sending-side mobile communication terminal 2 is sent to a receiving-side mobile communication terminal 200 via a multimedia message service center (MMSC) 20 using an email server 32 and a voice mail server 34. When a multimedia message sender authors the multimedia message with an email or voice mail function using the mobile communication terminal 2, and sends the authored multimedia message, the e-mail server 32 and voice mail server 34 send the authored multimedia message to the MMSC 20. The MMSC 20 then sends the multimedia message to the receiving-side mobile communication terminal after converting a format of the message.

Preferably, the MMSC 20 sends and receives the multimedia message, performs a message format conversion and an address format conversion of the message, and performs an SMS sending function for notifying receipt of the multimedia message. The MMSC 20 includes an MMS relay 22 and an MMS server 24. The MMS relay 22 is an MMS message exchanger, and performs a real-time multimedia exchange function, a connection setting function between MMS message sending/receiving terminals, a resource management function, a resource release function, an MMS message notification function, and others. The MMS server 24 performs a real-time streaming function of the MMS message, a function for storing and managing the multimedia message in a database and a push function for notifying receipt of the MMS message.

In order to perform these functions, the MMSC 20 is connected with a short message service center (SMSC) 40, a subscriber database (DB) 52, a home location register (HLR) 54, and a charge system 56. The MMSC 20 is also connected with the e-mail server 32, the voice mail server 34 and an advertiser server 36, via an Internet network 30.

The SMSC 40 notifies a multimedia message recipient of the receipt of the multimedia message using a character message. The subscriber DB 62 and HLR 64 manage and provide profile information of a multimedia message service subscriber. The subscriber DB 62 and HLR 64 also manage information related to the sending/receiving of the multimedia message. The charge system 66 generates and manages charge information according to details of multimedia contents and transmission details of the user of the mobile communication terminal 2 that authors and/or sends the multimedia message.

Figure 2:
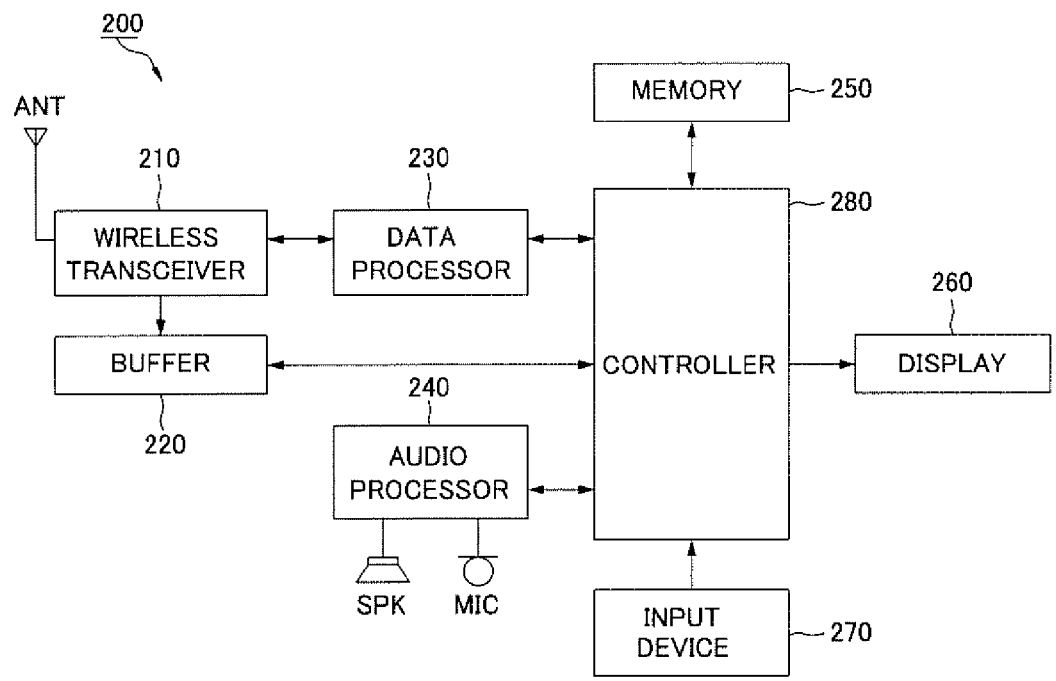
FIG. 2 is a block diagram illustrating a mobile communication terminal in accordance with an exemplary embodiment of the present invention.

FIG. 2 is a block diagram illustrating a mobile communication terminal in accordance with an exemplary embodiment of the present invention. Referring to FIG. 2, the mobile communication terminal 200 includes a wireless transceiver 210, a buffer 220, a data processor 230, an audio processor 240, a memory 250, a display 260, an input device 270 and a controller 280.

The wireless transceiver 210 performs a communication function of the mobile communication terminal 200. The wireless transceiver 210 includes an RF sender for up-converting and amplifying a frequency of a sending signal, and an RF receiver for low-noise amplifying a receiving signal and down-converting a frequency of the receiving signal.

In accordance with one embodiment of the present invention, the wireless transceiver 210 receives a notification message from the MMSC 20 for notifying the arrival of the multimedia message. The wireless transceiver 210 then sends the notification message to the data processor 230. Thereafter, the wireless transceiver 210 establishes a Real-time Transport Protocol (RTP)/RTP Control Protocol (RTCP) connection with the MMSC 20 under the control of the controller 280 to receive media files in real time from the MMSC 20.

Preferably, the buffer 220 temporarily stores the media files received in real time based on the RTP/RTCP from the MMSC 20. The data processor 230 includes a sender for encoding and modulating a sending signal and a receiver for decoding and demodulating a receiving signal. Preferably, the data processor 230 determines whether the multimedia message is a real-time streaming enable multimedia message, based on a specific field of the notification message, and sends the determined results to the controller 280.

The audio processor 240 plays an audio signal that is decoded and outputted by the data processor 230, or sends the audio signal produced by a microphone (MIC) to the data processor 230. Preferably, the audio processor 240 plays and outputs a sound file temporarily stored in the buffer 220 in real time under the control of the controller 280.

The memory 250 includes at least one program memory and data memory. The program memory stores programs for controlling general operations of the mobile communication terminal 200. Preferably, the memory 250 stores media files received from the buffer 220 under the control of the controller 280.

The display 260 displays various kinds of display information and menu screens, all of which are outputted from the mobile communication terminal 200. The display 260 may include a Liquid Crystal Display (LCD) or an Organic Light Emitting Diode (OLED), for example. The display 260 may also include two or more displays including an external display and an internal display. Preferably, the display 260 displays media files temporarily stored in the buffer 220 under the control of the controller 280.

The input device 270 includes at least one button for inputting numerical and character information, and at least one function button for setting various functions. The input device 160 may be implemented as a keypad, a jog-dial, a touch screen, and a joystick, for example, all of which include a directional key. Preferably, the input device 270 receives a download request for the multimedia message from the user and provides the received download request to the controller 280. The input device 270 also receives a streaming receiving mode of the multimedia message from the user and sends the received streaming receiving mode to the controller 280.

The controller 280 performs general control of the mobile communication terminal 200. Moreover, the controller 280 may include the data processor 220. Accordingly, a process for controlling the controller 280 is explained as follows.

FIG. 3 illustrates a flow chart of a method for playing a message in real time in accordance with an exemplary embodiment of the present invention. Referring to FIG. 3, the MMSC 20, which has received the multimedia message from the sending-side mobile communication terminal 2, sends a notification message (M-notification.ind) for notifying the receiving-side mobile communication terminal 200 of the arrival of the multimedia message (S310). Preferably, the M-notification.ind message is sent via the SMSC 40 in a short message form.

FIG. 4 illustrates a format of a header field of an M-notification.ind message in accordance with an exemplary embodiment of the present invention. Referring to FIG. 4, an X-Mms-Message-Class field 410 exists in the header field of the M-notification.ind message. The X-Mms-Message-Class field 410 is a field that defines a classification item of a message.

In accordance with one embodiment of the present invention, "streaming" may be added as a field value in the X-Mms-Message-Class field 410. Accordingly, if "streaming" is added in the X-Mms-Message-Class field 410, then the multimedia message is a real-time streaming enable multimedia message.

In other words, if the multimedia message sent from the sending-side mobile communication terminal 2 is determined as the real-time streaming enable message, the MMSC 20 adds "streaming" to the X-Mms-Message-Class field 410 of the notification message (M-notification.ind), and sends the notification message so that the receiving-side mobile communication terminal 200 can recognize the multimedia message as the real-time streaming enable message. If the notification message (M-notification.ind) is received from the MMSC 20, the receiving-side mobile communication terminal 200 sends a reply message (M-notifyresp.ind) to the MMSC 20 (S320 of FIG. 3).

FIG. 5 illustrates a flow chart of a process for sending an M-notifiyresp.ind message to a Multimedia Message Service Center (MMSC), as shown in FIG. 3, in accordance with an exemplary embodiment of the present invention. Referring to FIG. 5, the controller 280 of the receiving-side mobile communication terminal 200 determines whether the X-Mms-Message-Class field 410 of the notification message (M-notification.ind) sent from the MMSC 20 exists (S510), and determines whether the multimedia message sent from the sending-side mobile communication terminal 2 is the real-time streaming enable message (S520).

If the multimedia message is the real-time streaming enable message, the controller 280 indicates a multimedia message receiving mode of the receiving-side mobile communication terminal 200, available size information of the buffer 220 and channel information in an X-Mms-Status field of a reply message (M-notifyresp.ind) (S530). Afterward, the reply message is generated and sent to the MMSC (S540).

FIG. 6 illustrates a format of a header field of an M-notifyresp.ind message in accordance with an exemplary embodiment of the present invention. Referring to FIG. 6, the header field of the M-notifyresp.ind message includes the X-Mms-Status field 610. Preferably, the X-Mms-Status field 610 indicates a preference for receiving the multimedia message from the MMSC 20, and indicates a field value such as "retrieved", "rejected", and "deferred", for example. The field value "retrieved" represents a download request for the multimedia message. The field value "rejected" represents a preference for rejecting receipt of the multimedia message. The field value "deferred" represents a preference for deferring receipt of the multimedia message.

In accordance with one embodiment of the present invention, if the multimedia message sent from the sending-side mobile communication terminal 2 is determined as the real-time streaming enable message, a first streaming receiving mode "streamed 1" or a second streaming receiving mode "streamed 2" is added to the X-Mms-Status field 610 as multimedia message receiving mode information of the receiving-side mobile communication terminal 200 instead of the field value. The available size information of the buffer 220 and channel information are also indicated in the X-Mms-Status field 610.

When the multimedia message receiving mode of the receiving-side mobile communication terminal 200 is the first streaming mode, the controller 280 indicates on the X-Mms-Status field of the M-notifyresp.ind message that the multimedia message receiving mode of the receiving-side mobile communication terminal 200 is the first streaming mode. The controller 280 also adds the available size information of the buffer 220 and channel information to the X-Mms-Status field. Preferably, the channel information comprises channel band-width information measured from the receiving-side mobile communication terminal 200.

Meanwhile, if the multimedia message sent from the sending-side mobile communication terminal 2 is not the real-time streaming enable message (S520 of FIG. 5), the controller 280 indicates a field value such as "retrieved", "rejected", and "deferred", for example, on the X-Mms-Status field 610 and generates the reply message (S540 of FIG. 5).

According to the above-described process, the receiving-side mobile communication terminal 200 sends to the MMSC 20 the reply message (M-notifyresp.ind) in response to the notification message (M-notification.ind) (S540 of FIG. 5). As a result, the MMSC 20 receives the reply message (M-notifyresp.ind message) from the receiving-side mobile communication terminal 200, and thus can acknowledge a multimedia message receiving mode, available size information for the buffer 220, channel information, and other information.

Figure 7:
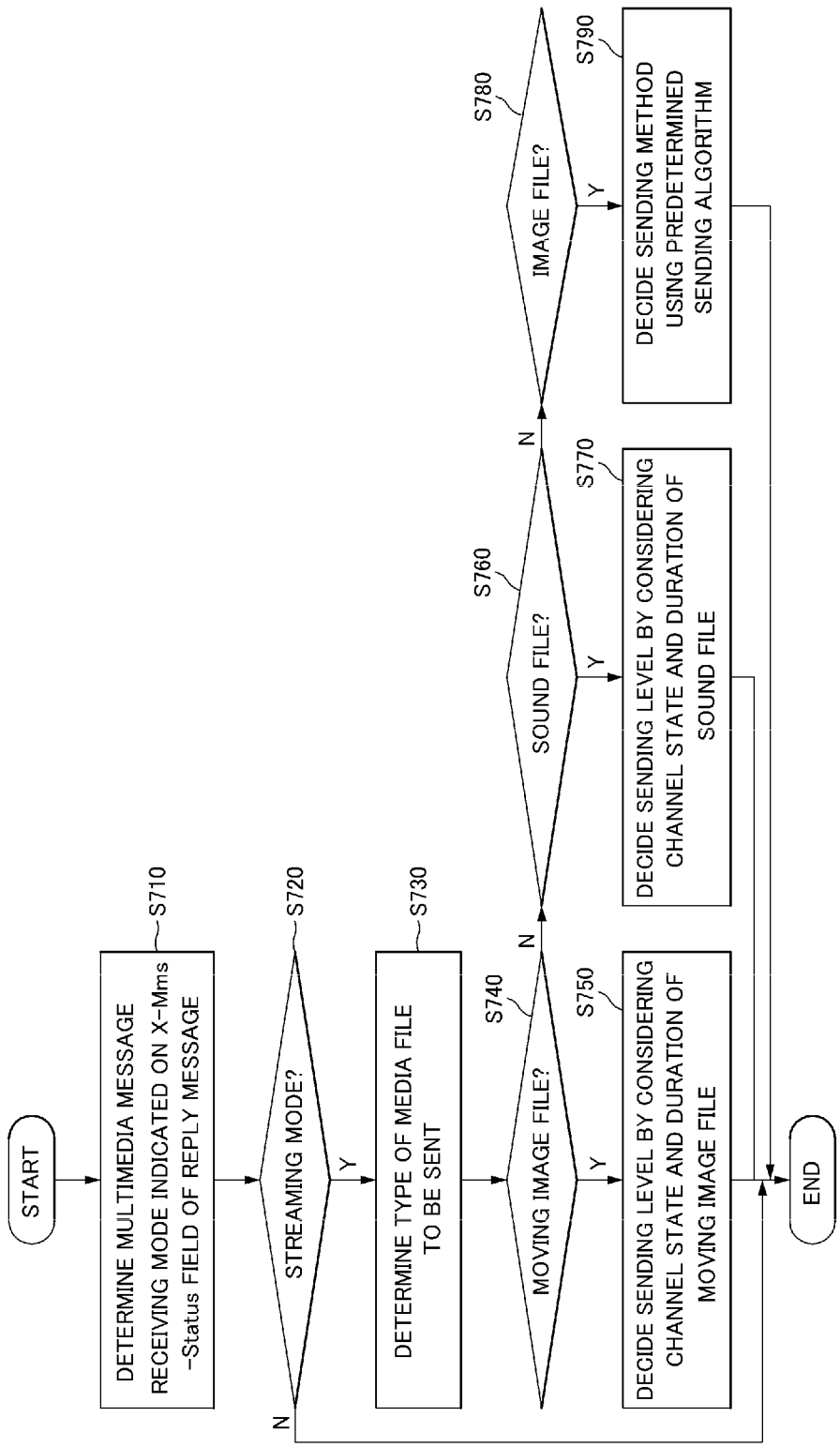
FIG. 7 illustrates a flow chart of a process for deciding a sending level, as shown in FIG. 3, in accordance with an exemplary embodiment of the present invention.

When receiving the M-notifyresp.ind message from the receiving-side mobile communication terminal 200, the MMSC 20 preferably decides a sending level of a media file to be sent to the receiving-side mobile communication terminal 200 (S330 of FIG. 3). FIG. 7 illustrates a flow chart of a process for deciding a sending level, as shown in FIG. 3, in accordance with an exemplary embodiment of the present invention.

Referring to FIG. 7, the MMSC 20 determines the multimedia message receiving mode indicated on the X-Mms-Status field 610 of the M-notifyresp.ind message (S710). If the multimedia message receiving mode is set to the streaming mode, i.e., the first streaming mode or the second streaming mode (S720), the MMSC 20 determines a type of the media file included in the multimedia message to be sent to the receiving-side mobile communication terminal 200 (S730).

The sending level is determined according to the type of the media file, which will now be explained as follows. If the media file included in the multimedia message is a moving image (S740), the MMSC 20 decides the sending level so that the moving image file can be played in real-time by considering channel information included in the M-notifyresp.ind message and a duration of the moving image file recorded in a synchronized multimedia integration language (SMIL) file sent from the sending-side mobile communication terminal 2 (S750).

Figure 8:
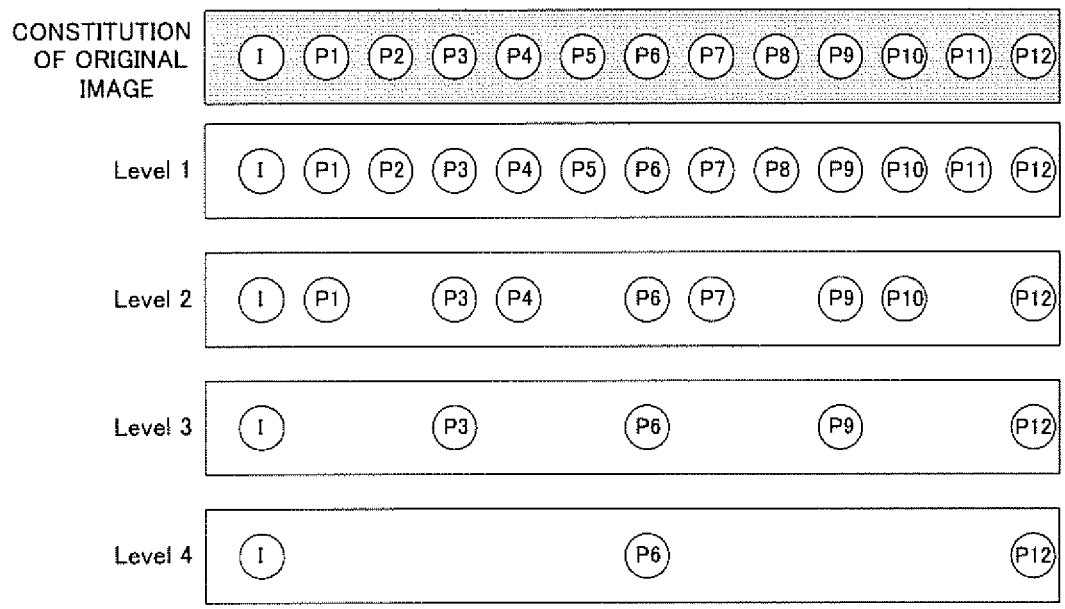
FIG. 8 illustrates a flow chart of a process for deciding a sending level of a moving image in accordance with an exemplary embodiment of the present invention.

FIG. 8 illustrates a flow chart of a process for deciding a sending level of a moving image in accordance with an exemplary embodiment of the present invention. Referring to FIG. 8, an original moving image file comprises an I-frame and 12 P-frames following the I-frame.

Preferably, the MMSC 20 decides one of four sending levels by considering channel information and the duration of the moving image file. In accordance with the present invention, the original moving image file is originally sent at a sending level 1. At a sending level 2, a series of two image frames is repeatedly sent after one image frame following the series of two image frames is not sent.

At a sending level 3, every third image frame is sent. Preferably, the I-frame is initially sent. Afterward, the 3rd, 6th, 9th, and 12th P-frames are respectively sent. At a sending level 4, every sixth image frame is sent. Preferably, the I-frame is initially sent, followed by the 6th and 12th P-frames, respectively.

Notably, the channel band-width narrows from the sending level 1 to the sending level 4. Moreover, the duration of the moving image becomes greater from the sending level 1 to the sending level 4.

Meanwhile, if the moving image file is included together with sound data synchronized to the moving image, the MMSC 20 decides the sending level according to the sending level of the moving image file, and sends each image frame together with the sound data. However, in case where the MMSC 20 cannot send the image frames according to the sending level of the moving image file due to the sound data, the MMSC 20 sends the image frames according to a sending level of a corresponding moving image file by lowering a bit rate of the sound data.

If the media file is a sound file (S760 of FIG. 7), the MMSC 20 decides the sending level by considering a duration and a channel state of the sound file (S770), similar to a method for deciding the sending level of the moving image file. Preferably, the MMSC 20 sends the sound file to the receiving-side mobile communication terminal 200 by controlling the bit rate of the sound file so that all sound files may be sent through the corresponding channel in duration. According to such method, the MMSC 20 decides each sending level of the moving image file and the sound file that will be sent to the receiving-side mobile communication terminal 200. However, if the media file is an image file (S780), the MMSC 20 decides a sending method using a predetermined sending algorithm, regardless of the method for deciding the sending level of the moving image file or the sound file.

In accordance with one embodiment of the present invention, the MMSC 20 generates black/white image data having only black/white information in the original image file, and sends the generated black/white image data to the receiving-side mobile communication terminal 200 in an 8×8 pixel unit. If the sending of the black/white image data is completed, the MMSC 20 sends color image data to the receiving-side mobile communication terminal 200 in an 8×8 pixel unit, similar to the black/white image data.

Referring again to FIG. 3, if the user of the receiving-side mobile communication terminal 200 checks the notification message and requests the "retrieving" of the multimedia message through the input device 270 (S340), the controller 280 sends a request message, such as a WSP/HTTP GET.req message, to the MMSC 20 through the wireless transceiver 210 (S350). Preferably, the WSP/HTTP GET.req message is a message for requesting a data connection to the MMSC 20, and more particularly, a message for requesting the MMSC 20 to send the multimedia message sent from the sending-side mobile communication terminal since the receiving-side mobile communication terminal 200 is ready to receive the multimedia message.

If the WSP/HTTP GET.req message is received from the receiving-side mobile communication terminal 200, the MMSC 20 sends a confirmation message, such as an M-retrieve.conf message, to the receiving-side mobile communication terminal 200 (S360). Preferably, the M-retrieve.conf message includes a SMIL file, and not any media files. The SMIL file is a text file including information regarding a method for playing media files attached to the multimedia message.

After the receiving-side mobile communication terminal 200 receives the M-retrieve.conf message from the MMSC 20, an RTP/RTCP connection or RT Streaming Protocol (RTSP) connection is established between the MMSC 20 and the receiving side mobile communication terminal 200 (S370). The MMSC 20 then sends the media files attached to the multimedia message to the receiving-side mobile communication terminal 20 using the RTP/RTCP-based or RTSP-based real-time transfer protocol.

Preferably, the MMSC 20 sends the media files according to the sending level decided in S330, and controls the flow of the media files sent by considering an available size of the buffer 220 in the mobile communication terminal 220. Preferably, the receiving-side mobile communication terminal 200 temporarily stores the media files received in real-time from the MMSC 20 in the buffer 220.

Preferably, if the multimedia message receiving mode of the receiving-side mobile communication terminal 200 is set to the first streaming mode, the receiving-side mobile communication terminal 200 displays the media files temporarily stored in the buffer 220 on the display 260. Thus, if the multimedia message receiving mode is set to the first streaming mode, the receiving-side mobile communication terminal 200 does not separately store the media files temporarily stored in the buffer 220 in the memory 250, but displays the media files in real time on the display 260. On the other hand, if the multimedia message receiving mode of the receiving side mobile communication terminal 200 is set to the second streaming mode, the receiving-side mobile communication terminal 200 stores the media files temporarily stored in the buffer 220 in the memory 250, and displays the media files received in real time on the display 260. If the real-time transmission of the media files from the MMSC 20 is completed, the receiving side mobile communication terminal 200 sends an acknowledgment message, such as an M-acknowledge.ind message, to the MMSC 20 for acknowledging receipt of the media files (S380).

As described above, the user of the mobile communication terminal can retrieve the multimedia message in real time. Furthermore, preferred embodiments of the present invention have been implemented by deciding the sending level of the media files, but they are not limited thereto. For example, when sending the M-retrieve.conf message to the receiving-side mobile communication terminal, the MMSC 20 may send the SMIL file without the media files. Accordingly, the receiving-side mobile communication terminal 200 can analyze the SMIL file to acknowledge duration and type of the media files attached to the multimedia message.

Therefore, after deciding the sending level of the media files in the receiving-side mobile communication terminal 200 by considering channel information and duration information of each media file, the decided sending level information is sent to the MMSC 20. The MMSC 20 then sends the media files according to the sending level information received from the receiving-side mobile communication terminal 200.

In accordance with the present invention, the mobile communication terminal and method for playing messages in real time in the mobile communication terminal have the following advantages. A receiving-side mobile communication terminal can download and play media files attached to the multimedia message in real time. Therefore, even if storage space for the multimedia message is limited because previously-stored media files are not to be deleted, multimedia message contents received from a sending-side mobile communication terminal can still be retrieved.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for outputting a message in a mobile communication terminal, the method comprising:
   receiving, from a server, a notification message for notifying arrival at the server of a specific multimedia message transmitted from a sending side mobile communication terminal, the specific multimedia message including at least one media file, the notification message comprising a specific field indicating whether the at least one media file is streamable;
   outputting the notification message, allowing a user to take an action with regard to the specific multimedia message in response to the notification message;
   receiving a first user input for setting a streaming receiving mode when the specific field indicates that the at least one media file is streamable;
   generating a first reply message in response to the notification message, the first reply message comprising a specific field including streaming receiving mode information according to the streaming receiving mode set in response to the first user input, the streaming receiving mode information indicating whether the at least one media file is to be stored in a memory of the mobile communication terminal which is distinct from a buffer of the mobile communication terminal;
   sending the generated first reply message to the server;
   requesting a connection with the server;
   receiving the at least one media file in real-time from the server according to a sending level that is changeable based on a type of the at least one media file;
   storing the received at least one media file, which is temporarily in the buffer, in the memory when the streaming receiving mode information is set to a first streaming mode;
   outputting the at least one media file temporarily stored in the buffer in real-time,
   wherein the received at least one media file, which is temporarily stored in the buffer, is not stored in the memory when the streaming receiving mode information is set to a second streaming mode;
   receiving a download request, instead of the first user input, from a user when the specific field of the notification message indicates that the at least one media file is not streamable;
   generating a second reply message in response to the notification message when the specific field indicates that the at least one media file is not streamable, the second reply message comprising a specific field including a field value corresponding to the download request;
   sending the generated second reply message to the server; and
   storing the specific multimedia message received in response to the second reply message in the memory without storing the at least one media file in the buffer.

2. The method of claim 1, wherein the server is a multimedia message service center (MMSC).

3. The method of claim 1, further comprising sending a third reply message, which includes indication of rejection of the specific multimedia message, to the server in response to the notification message, wherein the specific multimedia message is not received by the mobile communication terminal when the third reply message is sent to the server instead of the first reply message in response to the notification message.

4. The method of claim 1, wherein the specific field of the notification message is an X-Mms-Message-Class field comprising information related to whether the at least one media file is streamable in real-time.

5. The method of claim 1, wherein the specific field of the first reply message further comprises at least an available buffer size or channel band-width information.

6. The method of claim 1, wherein receiving the at least one media file in real time comprises:
   receiving a message comprising a synchronized multimedia integration language (SMIL) file from the server; and
   receiving the at least one media file via Real-time Transport Protocol (RTP)/RTP Control Protocol (RTCP) connection established between the server and the mobile communication terminal.

7. The method of claim 1, wherein receipt of the specific multimedia message is deferred when a third reply message, which includes indication of deferral of the specific multimedia message, is sent to the server instead of the first reply message in response to the notification message comprising the specific field indicating that the at least one media file is streamable.

8. The method of claim 1, wherein the type of the at least one media file includes at least a moving image file, a sound file, or an image file, and the method further comprises:
   receiving the moving image file at a first sending level;
   receiving the sound file at a second sending level; and
   receiving the image file at a third sending level.

9. The method of claim 1, wherein the notification message is received in a short message form.

10. The method of claim 9, wherein the notification message is received by performing a Short Message Service (SMS) function.

11. A mobile communication terminal configured to output a message, the mobile communication terminal comprising:
   a wireless transceiver configured to:
      receive, from a server, a notification message notifying arrival of a specific multimedia message including at least one media file and originated from a sending side mobile communication terminal, the notification message comprising a specific field indicating whether the at least one media file is streamable; and receive the at least one media file from the server in real-time according to a sending level that is changeable based on a type of the at least one media file in response to a connection request transmitted to the server;

a processor configured to determine whether the at least one media is streamable in real-time according to the specific field of the notification message;

a buffer configured to temporarily store the received at least one media file when the at least one media file is streamable;

a memory that is distinct from the buffer and configured to store data;

an input device configured to receive a first user input for setting a streaming receiving mode when the at least one media file is streamable; and a controller configured to:
- generate a first reply message in response to the notification message, the first reply message comprising a specific field including streaming receiving mode information according to the streaming receiving mode set in response to the first user input, the streaming receiving mode information indicating whether the received at least one media file is to be stored in the memory;
- control the wireless transceiver to transmit the generated first reply message to the server;
- control the wireless transceiver to transmit the connection request to the server;
- control a real-time output of the at least one media file that is temporarily stored in the buffer;
- cause the memory to store the at least one media file, which is temporarily stored in the buffer, when the streaming receiving mode information is set to a first streaming mode in response to the first user input, wherein the received at least one media file, which is temporarily stored in the buffer, is not stored in the memory when the streaming receiving mode information is set to a second streaming mode in response to the first user input;
- generate a second reply message in response to the notification message when the specific field indicates that the at least one media file is not streamable according to a download request, which is received instead of the first user input via the input device when the at least one media file is not streamable, the second reply message comprising a specific field including a field value corresponding to the download request;
- control the wireless transceiver to transmit the generated second reply message to the server; and
- cause the memory to store the specific multimedia message received in response to the second reply message without storing the at least one media file in the buffer.

12. The mobile communication terminal of claim 11, wherein the specific field of the notification message is an X-Mms-Message-Class field comprising information related to whether the at least one media is streamable in real-time.

13. The mobile communication terminal of claim 11, wherein the specific field of the first reply message further comprises at least an available buffer size or channel bandwidth information.

14. The mobile communication terminal of claim 11, wherein the wireless transceiver is further configured to receive a confirmation message comprising a synchronized multimedia integration language (SMIL) file from the server, and
wherein the controller is further configured to:
- determine the sending level according to channel bandwidth information and a duration of the at least one media file indicated in the SMIL file; and
- control the wireless transceiver to transmit the determined sending level to the server.

15. The mobile communication terminal of claim 11, wherein the wireless transceiver is further configured to receive the at least one media file via a Real-time Transport Protocol (RTP)/RTP Control Protocol (RTCP) connection established between the server and the mobile communication terminal.

16. The mobile communication terminal of claim 11, further comprising:
- a display configured to display the at least one media file in real-time when the at least one media file is an image file; and
- an audio processor configured to output the at least one media file in real-time when the at least one media file is a sound file.

* * * * *